United States Patent
Gao et al.

(10) Patent No.: US 12,218,784 B2
(45) Date of Patent: Feb. 4, 2025

(54) SIGNAL TRANSMISSION CIRCUIT ELEMENT, MULTIPLEXER CIRCUIT ELEMENT AND DEMULTIPLEXER CIRCUIT ELEMENT

(71) Applicant: LeRain Technology Co., Ltd., New Taipei (TW)

(72) Inventors: Miaobin Gao, New Taipei (TW); Chia-Chi Hu, New Taipei (TW)

(73) Assignee: LERAIN TECHNOLOGY CO., LTD., New Taipei (TW)

( * ) Notice: Subject to any disclaimer, the term of this patent is extended or adjusted under 35 U.S.C. 154(b) by 603 days.

(21) Appl. No.: 17/507,974

(22) Filed: Oct. 22, 2021

(65) Prior Publication Data
US 2022/0393915 A1 Dec. 8, 2022

(30) Foreign Application Priority Data

Jun. 7, 2021 (TW) ................................ 110120651

(51) Int. Cl.
*H04L 25/03* (2006.01)
*H04L 5/02* (2006.01)
*H04L 25/02* (2006.01)
*H04L 27/00* (2006.01)

(52) U.S. Cl.
CPC ........ *H04L 25/03343* (2013.01); *H04L 5/023* (2013.01); *H04L 25/0264* (2013.01); *H04L 25/03878* (2013.01); *H04L 27/0014* (2013.01); *H04L 2027/0042* (2013.01)

(58) Field of Classification Search
CPC .............. H04L 25/03343; H04L 5/023; H04L 25/0264; H04L 25/03878; H04L 27/0014; H04L 2027/0042
See application file for complete search history.

(56) References Cited

U.S. PATENT DOCUMENTS

| | | | |
|---|---|---|---|
| 2013/0294464 A1* | 11/2013 | Katsurai | H04J 3/0635 370/516 |
| 2015/0263704 A1* | 9/2015 | Lee | H04L 25/028 327/306 |

FOREIGN PATENT DOCUMENTS

| | | |
|---|---|---|
| CN | 104917509 A | 9/2015 |
| TW | 201803286 A | 1/2018 |

* cited by examiner

*Primary Examiner* — Natasha W Cosme
(74) *Attorney, Agent, or Firm* — MUNCY, GEISSLER, OLDS & LOWE, P.C.

(57) ABSTRACT

A signal transmission circuit element, a multiplexer circuit element and a demultiplexer circuit element are disclosed. The signal transmission circuit element is connected among multiple electronic modules so as to transmit an electrical signal. The signal transmission circuit element includes an input terminal, an input equalizer, an output driver and an output terminal. The input terminal is for inputting an electrical signal to the input equalizer. The output driver is electrically connected to the input equalizer. The output terminal is electrically connected to the output driver so as to output the electrical signal. Accordingly, after the input terminal receives the electrical signal, the input equalizer can perform gain compensation on the electrical signal, and then an output capacitance of the electrical signal is driven by the output driver and outputted through the output terminal.

7 Claims, 5 Drawing Sheets

SIGNAL TRANSMISSION CIRCUIT ELEMENT, MULTIPLEXER CIRCUIT ELEMENT AND DEMULTIPLEXER CIRCUIT ELEMENT

BACKGROUND OF THE INVENTION

Field of the Invention

The present invention relates to a signal transmission circuit element, a multiplexer circuit element and a demultiplexer circuit element, and in particularly to a signal transmission circuit element, a multiplexer circuit element and a demultiplexer circuit element that can perform gain compensation on a signal.

Description of the Prior Art

Data communication and transmission rates are ever-increasing as technologies continue to progress. High-speed data transmission is demanded by both communication devices and data server devices. Currently, the transmission speed of PCIe Gen5 can achieve up to 32 Gb/s, and the transmission speed of PCIe Gen6 can be as high as 64 Gb/s. In such high-speed transmission environments, a multiplexer or demultiplexer in a signal transmission path becomes the critical factor for achieving good data transmission quality. In a circuit, a passive multiplexer and demultiplexer are equivalent to an ideal switch added with passive resistance on a signal path. However, path loss and an additional time constant caused by the passive resistance are unacceptable in high-speed applications. Moreover, the data quality of a signal having been processed by the passive multiplexer and demultiplexer cannot be further improved.

Please refer to FIG. 1, which shows a structural schematic diagram of a multiplexer circuit element of the prior art.

In the prior art, a multiplexer circuit element 80 includes a first transmission gate 81, a second transmission gate 82 and a third transmission gate 83. The first transmission gate 81 receives and then outputs a first input signal A_IN. The second transmission gate 82 receives and then outputs a second input signal B_IN. The third transmission gate 83 receives the first input signal A_IN or the second input signal B_IN and transmits an output signal C_OUT to an output terminal. A first control signal c1 and a second control signal c2 are complementary signals and are for turning on or turning off the first transmission gate 81 and the second transmission gate 82. When the first control signal c1 is equal to 1 and the second control signal c2 is equal to 0, the first transmission gate 81 is turned on and the second transmission gate 82 is turned off. When the first control signal c1 is equal to 0 and the second control signal c2 is equal to 1, the first transmission gate 81 is turned off and the second transmission gate 82 is turned on. Thus, the first input signal A_IN or the second input signal B_IN may be selectively transmitted to the third transmission gate 83. The third transmission gate 83 is constantly in a turned-on state.

Please refer to FIG. 2, which shows a structural schematic diagram of a demultiplexer circuit element of the prior art.

In the prior art, a demultiplexer circuit element 90 includes a first transmission gate 91, a second transmission gate 92 and a third transmission gate 93. The first transmission gate 91 receives an input signal C_IN from an input terminal and then outputs the input signal C_IN to the second transmission gate 92 or the third transmission gate 93. The first transmission gate 91 is constantly turned on, and the second transmission gate 92 and the third transmission gate 93 are controlled by a first control signal c1 and a second control signal c2. The first control signal c1 and the second control signal c2 are complementary signals and are for turning on or turning off the second transmission gate 92 and the third transmission gate 93. When the first control signal c1 is equal to 1 and the second control signal c2 is equal to 0, the second transmission gate 92 is turned on and the third transmission gate 93 is turned off. When the first control signal c1 is equal to 0 and the second control signal c2 is equal to 1, the third transmission gate 93 is turned on and the second transmission gate 92 is turned off. Thus, the first output signal A_OUT may be outputted through the second transmission gate 92, or the second output signal B_OUT may be outputted through the third transmission gate 93.

However, in the prior art, an input electrical signal encounters different input impedances and additional path loss, and an output electrical signal encounters additional path loss and a large capacitance. Therefore, because the passive multiplexer circuit element 80 or demultiplexer circuit element 90 in a turned-on state is equivalent to a passive resistance, the multiplexer circuit element 80 or the demultiplexer circuit element 90 cannot easily satisfy the input impedance or compensate for the additional loss. Even if the consumption of tuned resistance of the multiplexer circuit element 80 or the demultiplexer circuit element 90 satisfies terminal impedance, it could not meet all varying border conditions by using such passive means.

Therefore, there is a need to invent a signal transmission circuit element, a multiplexer circuit element and a demultiplexer circuit element for solving the issues of the prior art.

SUMMARY OF THE INVENTION

It is a primary object of the present invention to provide a signal transmission circuit element which has the gain compensation effect for the signal.

It is another object of the present invention to provide a multiplexer circuit element applying the technique above.

It is yet another object of the present invention to provide a demultiplexer circuit element applying the technique above.

To achieve the objects above, a signal transmission circuit element of the present invention is connected among multiple electronic modules so as to transmit an electrical signal among the multiple electronic modules. The signal transmission circuit element includes an input terminal, an input equalizer, an output driver and an output terminal. The input terminal is for inputting an electrical signal. The input equalizer is electrically connected to the input terminal. The output driver is electrically connected to the input equalizer. The output terminal is electrically connected to the output driver so as to output the electrical signal. Accordingly, after the input terminal receives the electrical signal, the input equalizer can perform gain compensation on the electrical signal, and then an output capacitance of the electrical signal is driven by the output driver and outputted through the output terminal.

A multiplexer circuit element of the present invention is adapted to be connected at least between a first electronic module, a second electronic module and a third electronic module so as to transmit an electrical signal selectively from the first electronic module or the second electronic module to the third electronic module. The multiplexer circuit element includes a first input terminal, a second input terminal, a first equalizer, a second equalizer, an output driver and an output terminal. The first input terminal is electrically connected to the first electronic module. The second input terminal is electrically connected to the second electronic module. The first equalizer is electrically connected to the first input terminal. The second equalizer is electrically connected to the second input terminal. The output driver is electrically connected to the first equalizer and the second equalizer. The output terminal is electrically connected to the output driver and the third electronic module. Thus, after the first input terminal or the second input terminal receives the electrical signal, the first equalizer or the second equalizer can perform gain compensation on the electrical signal, and then an output capacitance of the electrical signal is driven by the output driver and outputted through the output terminal.

A demultiplexer circuit element of the present invention is adapted to be connected at least between a first electronic module, a second electronic module and a third electronic module so as to transmit an electrical signal from the first electronic module selectively to the second electronic module or the third electronic module. The demultiplexer circuit element includes an input terminal, an input equalizer, a first driver, a second driver, a first output terminal and a second output terminal. The input terminal is electrically connected to the first electronic module. The input equalizer is electrically connected to the first terminal. The first driver is electrically connected to the input equalizer. The second driver is also electrically connected to the input equalizer. The first output terminal is electrically connected to the first driver and the second electronic module. The second output terminal is electrically connected to the second driver and the third electronic module. Accordingly, after the input terminal receives the electrical signal, the input equalizer can perform gain compensation on the electrical signal, and then an output capacitance of the electrical signal is driven by the first driver or the second driver and outputted through the first output terminal or the second output terminal.

DETAILED DESCRIPTION OF THE EMBODIMENTS

Preferred specific embodiments are given below to allow better understanding of the technical contents of the present invention.

Figure 1:
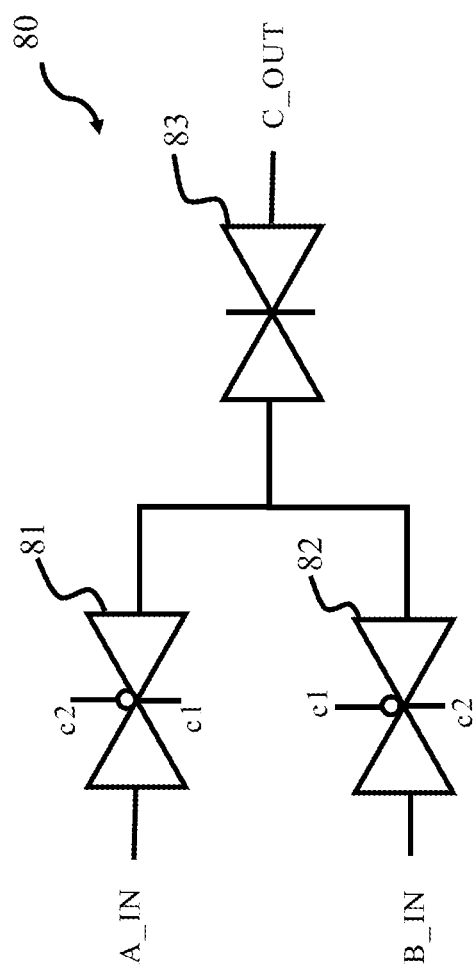
FIG. 1 is a structural schematic diagram of a multiplexer circuit element of the prior art.
Figure 2:
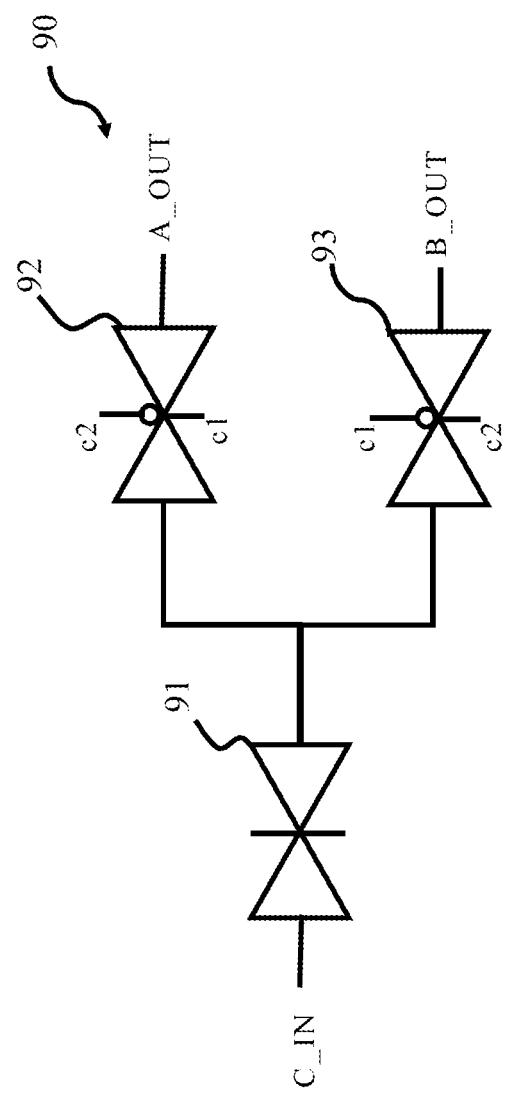
FIG. 2 is a structural schematic diagram of a demultiplexer circuit element of the prior art.
Figure 3:
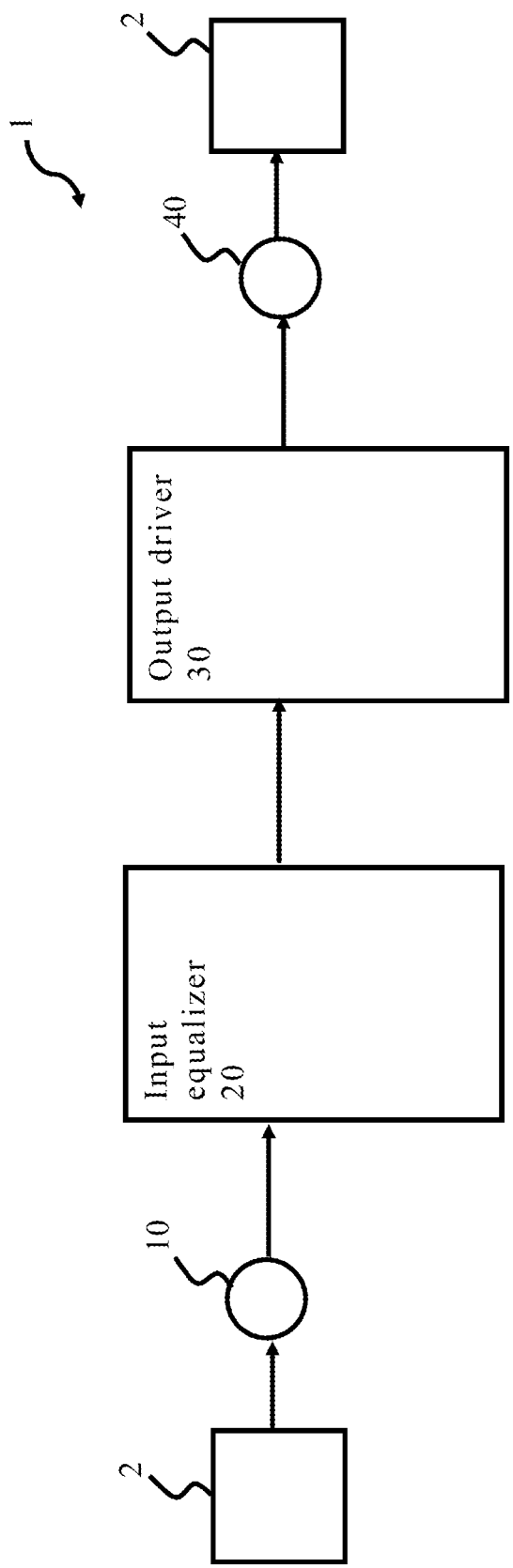
FIG. 3 is a structural schematic diagram of a signal transmission circuit element of the present invention.

Please refer to FIG. 3, which shows a structural schematic diagram of a signal transmission circuit element of the present invention.

A signal transmission circuit element 1 of the present invention is connected among a plurality of electronic modules 2 so as to transmit an electrical signal among the plurality of electronic modules 2. The plurality of electronic modules 2 may be categorized into input signal electronic modules and output signal electronic modules, and the signal transmission circuit element 1 can selectively input the electrical signal through the plurality of input signal electronic modules, respectively, and then output the electrical signal to the output signal electronic modules. Alternatively, after the electrical signal is inputted through the input signal electronic modules, the signal transmission circuit component 1 can selectively output the electrical signal to the plurality of output signal electronic modules, respectively. The numbers of the plurality of electronic modules 2 are not limited by the present invention. It should be noted that, although the terms "first" and "second" are used to describe various elements of the present invention, these terms are not to be construed as limitations of the elements. Such terms are merely for differentiating one element from another element. For example, without departing from the scope of the various embodiments described, a first input terminal may be referred to as a second terminal, and similarly, a second input terminal may be referred to as a first input terminal. Moreover, the first input terminal and the second input terminal are both input terminals but are not the same input terminal.

The signal transmission circuit element 1 includes an input terminal 10, an input equalizer 20, an output driver 30 and an output terminal 40. The input terminal 10 is for inputting the electrical signal. The input equalizer 20 is electrically connected to the input terminal 10. The output driver 30 is electrically connected to the input equalizer 20. The output terminal is 40 electrically connected to the output driver 30 so as to output the electrical signal. Accordingly, the input equalizer 20 can perform gain compensation on the electrical signal, and then an output capacitance of the electrical signal is driven by the output driver 30. The numbers of the input equalizer 20 and the output driver 30 are adjusted according to the numbers of the input signal electronic modules and output signal electronic modules, and the signal transmission circuit element 1 may be structured as having a many-to-one or one-to-many signal transmission path.

Figure 4:
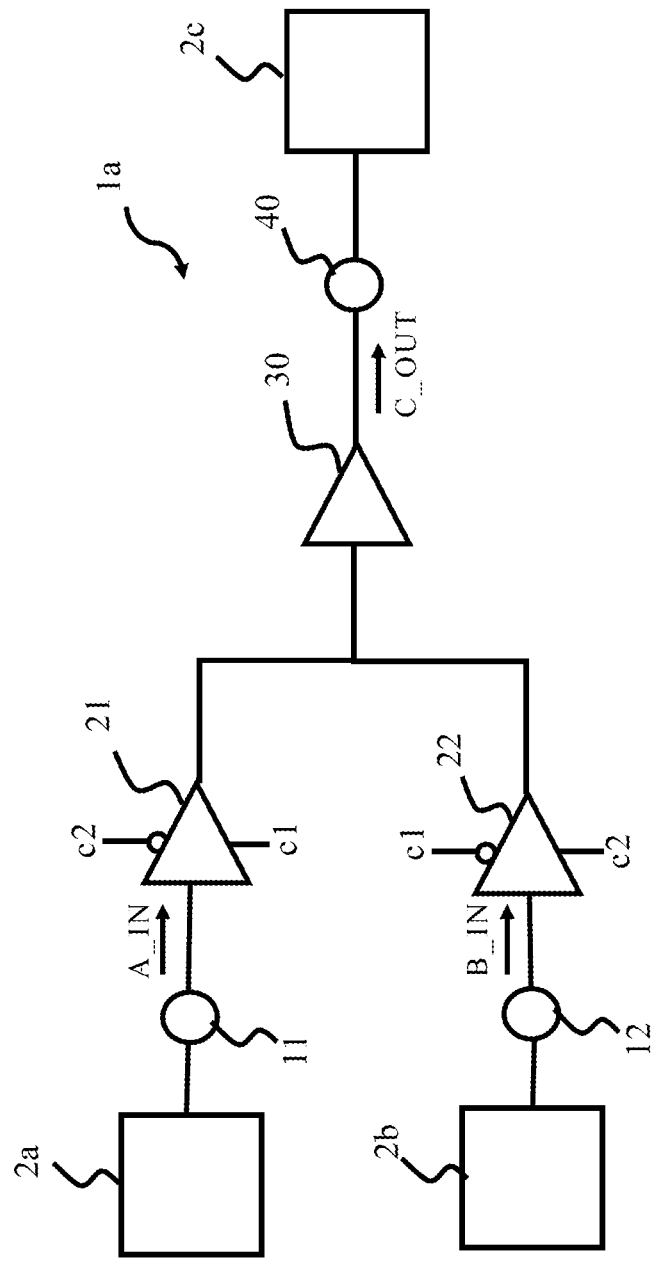
FIG. 4 is a structural schematic diagram of a multiplexer circuit element of the present invention.

Please refer to FIG. 4, which shows a structural schematic diagram of a multiplexer circuit element of the present invention.

In the first embodiment of the present invention, the signal transmission circuit element 1 is a multiplexer circuit element 1a in a 2-to-1 form so as to be connected between two input signal electronic modules and one output signal electronic module; however, the present invention is not limited to the numbers above. The multiplexer circuit element 1a is adapted to be connected between a first electronic module 2a, a second electronic module 2b and a third electronic module 2c, wherein the first electronic module 2a and the second electronic module 2b are input signal electronic modules and the third electronic module 2c is an output signal electronic module. Thus, the multiplexer circuit element 1a is capable of transmitting an electrical signal selectively from the first electronic module 2a or the second electronic module 2b to the third electronic module 2c.

The multiplexer circuit element 1a includes a first input terminal 11, a second input terminal 12, an output terminal 40, a first equalizer 21, a second equalizer 22, and an output driver 30. The first input terminal 11 and the second input terminal 12 belong to input terminals 10 and are electrically connected to the first electronic module 2a and the second electronic module 2b so as to receive a first input signal A_IN and a second input signal B_IN, respectively. The first equalizer 21 and the second equalizer 22 belong to the input equalizer 20, wherein the first equalizer 21 is electrically connected to the first terminal 11 and the second equalizer 22 is electrically connected to the second terminal 12. The output driver 30 is electrically connected to the first equalizer 21 and the second equalizer 22 and further electrically connected to an output terminal 40. Thus, the output terminal 40 is eventually electrically connected to the third electronic module 2c so as to transmit an output signal C_OUT to the third electronic module 2c.

In the first embodiment of the present invention, the first equalizer 21 and the second equalizer 22 use a first control signal c1 and a second control signal c2 for turning on or off, wherein the first control signal c1 and the second control signal c2 are complementary signals. When the first control signal c1 is equal to 1 and the second control signal c2 is equal to 0, the first equalizer 21 is turned on and the second equalizer 22 is turned off. When the first control signal c1 is equal to 0 and the second control signal c2 is equal to 1, the first equalizer 21 is turned off and the second equalizer 22 is turned on. Thus, the multiplexer circuit element 1a is capable of selectively transmitting the first input signal A_IN or the second input signal B_IN to the output driver 30. The output driver 30 is constantly in a turned-on state. Accordingly, the first equalizer 21 or the second equalizer 22 can perform gain compensation for the loss of the first input signal A_IN or the second input signal B_IN, and then an output capacitance of the output signal C_OUT is driven by the output driver 30.

Figure 5:
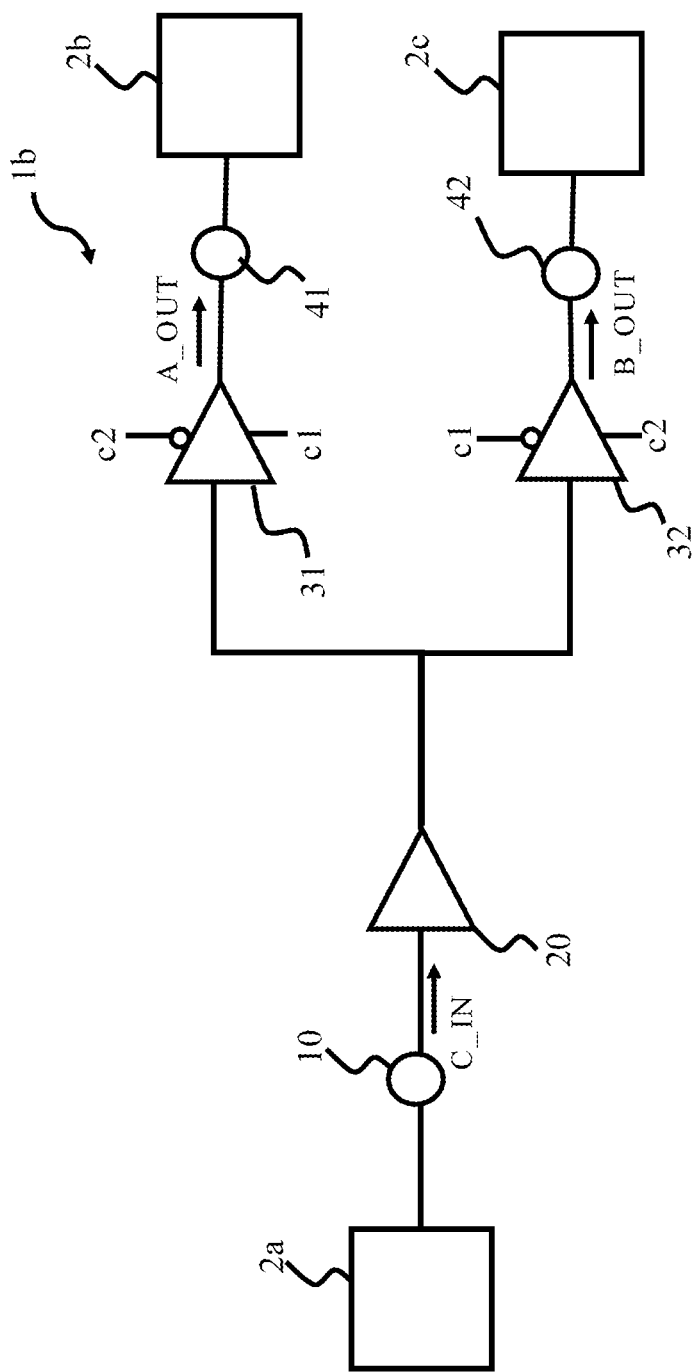
FIG. 5 is a structural schematic diagram of a demultiplexer circuit element of the present invention.

Please refer to FIG. 5, which shows a structural schematic diagram of a demultiplexer circuit element of the present invention.

In the second embodiment of the present invention, the signal transmission circuit element 1 is a demultiplexer circuit element 1b in a 1-to-2 form so as to be connected between one input signal electronic module and two output signal electronic modules; however, the present invention is not limited to the numbers above. The demultiplexer circuit element 1b is adapted to be connected between a first electronic module 2a, a second electronic module 2b and a third electronic module 2c, wherein the first electronic module 2a is an input signal electronic module and the second electronic module 2b and the third electronic module 2c are output signal electronic modules. Thus, the demultiplexer circuit element 1b is capable of transmitting an electrical signal from the first electronic module 2a selectively to the second electronic module 2b or the third electronic module 2c.

The demultiplexer circuit element 1b includes an input terminal 10, an input equalizer 20, a first driver 31, a second driver 32, a first output terminal 41 and a second output terminal 42. The input terminal 10 is electrically connected to the first electronic module 2a so as to receive an input signal C_IN. The input equalizer 20 is electrically connected to the input terminal 10 and then electrically connected to the first driver 31 and the second driver 32. The first driver 31 and the second driver 32 belong to output driver 30 and are electrically connected to the first output terminal 41 and the second output terminal 42, respectively. The first output terminal 41 and the second output terminal 42 are eventually electrically connected to the second electronic module 2b and the third electronic module 2c, respectively, so as to transmit a first output signal A_OUT to the second electronic module 2b or transmit a second output signal B_OUT to the third electronic module 2c.

In the second embodiment of the present invention, the first driver 31 and the second driver 32 use a first control signal c1 and a second control signal c2 for turning on or off, wherein the first control signal c1 and the second control signal c2 are complementary signals. When the first control signal c1 is equal to 1 and the second control signal c2 is equal to 0, the first driver 31 is turned on and the second driver 32 is turned off. When the first control signal c1 is equal to 0 and the second control signal c2 is equal to 1, the first driver 31 is turned off and the second driver 32 is turned on. The input equalizer 20 is constantly in a turned-on state. Thus, selectively, the first output signal A_OUT can be transmitted to the second electronic module 2b or the second output signal B_OUT can be transmitted to the third electronic module 2c. Accordingly, the input equalizer 20 can perform gain compensation for the loss of the input signal C_IN, and then an output capacitance of the first output signal A_OUT or the second output signal B_OUT is driven by the first driver 31 or the second driver 32.

In general, an input electrical signal encounters different input impedances and additional path loss, and an output electrical signal encounters additional path loss and a large capacitance. It can be understood from the description above that the active multiplexer circuit element 1a or demultiplexer circuit element 1b of the present invention is capable of easily satisfying the required input impedance or compensating for the additional loss. The first equalizer 21, the second equalizer 22 or the input equalizer 20 is capable of compensating for any additional loss, and the output driver 30, the first driver 31 or the second driver 32 is capable of driving an output capacitance. Thus, the active signal transmission circuit element 1, multiplexer circuit element 1a or demultiplexer circuit element 1b results in only a path capacitance added on a signal path without increasing the resistance on the signal path. Therefore, it actively meets all constantly varying border conditions and is suitable for environments needing high-speed data transmission, and it is apparently superior to designs of the prior art.

It should be noted that the embodiments given above are examples of the present invention rather than limitations of the present invention. Any variation without departing from the fundamental structure of the invention is to be encompassed within the scope of protection in accordance with the broadest interpretation of the appended claims.

What is claimed is:

1. A signal transmission circuit element, connected among a plurality of electronic modules so as to transmit an electrical signal among the plurality of electronic modules, the signal transmission circuit element comprising:
   an input terminal, for inputting the electrical signal;
   an input equalizer, electrically connected to the input terminal;
   an output driver, electrically connected to the input equalizer; and
   an output terminal, electrically connected to the output driver so as to output the electrical signal;
   wherein, after the input terminal receives the electrical signal, the input equalizer performs gain compensation on the electrical signal, and an output capacitance of the electrical signal is driven by the output driver and then outputted through the output terminal.

2. The signal transmission circuit element according to claim 1, wherein the plurality of electronic modules comprise a plurality of input signal electronic modules and an output signal electronic module, the signal transmission circuit element further comprising:
   a plurality of input terminals, electrically connected to the plurality of input signal electronic modules; and
   a plurality of input equalizers, electrically connected to the plurality of input terminals;
   wherein the output driver is electrically connected to the plurality of input equalizers and the output terminal is electrically connected to the output driver and the output signal electronic module.

3. The signal transmission circuit element according to claim 2, wherein the signal transmission circuit element is a multiplexer.

4. The signal transmission circuit element according to claim 1, wherein the plurality of electronic modules comprise an input signal electronic module and a plurality of output signal electronic modules, wherein the input terminal is electrically connected to the input signal electronic module, the signal transmission circuit element further comprising:
   a plurality of output drivers, electrically connected to the input equalizer; and
   a plurality of output terminals, electrically connected to the plurality of output drivers and the plurality of output signal electronic modules.

5. The signal transmission circuit element according to claim 4, wherein the signal transmission circuit element is a demultiplexer.

6. A demultiplexer circuit element, adapted to be connected between a first electronic module, a second electronic module and a third electronic module so as to transmit an electrical signal from the first electronic module selectively to the second electronic module or the third electronic module; the demultiplexer circuit element comprising:
   an input terminal, electrically connected to the first electronic module;
   an input equalizer, electrically connected to the input terminal;
   a first driver, electrically connected to input equalizer;
   a second driver, electrically connected to the input equalizer;
   a first output terminal, electrically connected to the first driver and the second electronic module; and
   a second output terminal, electrically connected to the second driver and the third electronic module;
   wherein, after the input terminal receives the electrical signal, the input equalizer performs gain compensation on the electrical signal and an output capacitance of the electrical signal is driven by the first driver or the second driver and outputted through the first output terminal or the second output terminal.

7. The demultiplexer circuit component according to claim 6, wherein the first driver and the second driver use a first control signal and a second control signal for turning on or off, wherein the first control signal and the second control signal are complementary signals.

* * * * *